United States Patent
Wilson

(10) Patent No.: US 8,688,788 B2
(45) Date of Patent: Apr. 1, 2014

(54) SYSTEM AND METHOD FOR AUTOMATICALLY RESPONDING TO A MESSAGE SENT TO A USER AT AN EMAIL SERVER

(75) Inventor: Nicholas Bryson Wilson, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 506 days.

(21) Appl. No.: 11/833,521

(22) Filed: Aug. 3, 2007

(65) Prior Publication Data

US 2009/0037541 A1 Feb. 5, 2009

(51) Int. Cl.
*G06F 15/16* (2006.01)
*H04M 1/64* (2006.01)
*G09G 5/399* (2006.01)

(52) U.S. Cl.
USPC ......... 709/206; 709/207; 379/88.05; 345/539

(58) Field of Classification Search
USPC .......................................................... 709/206
See application file for complete search history.

(56) References Cited

U.S. PATENT DOCUMENTS

| | | | |
|---|---|---|---|
| 6,816,885 B1 | 11/2004 | Raghunandan | |
| 7,475,109 B1 * | 1/2009 | Fletcher et al. | 709/204 |
| 2003/0120733 A1 * | 6/2003 | Forman | 709/206 |
| 2005/0021636 A1 | 1/2005 | Kumar | |
| 2005/0066005 A1 | 3/2005 | Paul | |
| 2005/0076090 A1 * | 4/2005 | Thuerk | 709/207 |
| 2006/0167834 A1 * | 7/2006 | Rubel, Jr. | 707/1 |
| 2008/0071752 A1 * | 3/2008 | Azuma et al. | 707/3 |
| 2009/0019126 A1 * | 1/2009 | Adkins | 709/206 |

OTHER PUBLICATIONS

Boyce, "Microsoft Office Outlook 2003 Inside Out," Microsoft Press, Nov. 2005.*
Boyce, "Microsoft Office Outlook 2003 Inside Out," Microsoft Press, Nov. 5, 2003 (p. 113 added).*
European Search Report for EP 07 11 3775, mailed Feb. 8, 2008.

* cited by examiner

*Primary Examiner* — Evans Desrosiers
(74) *Attorney, Agent, or Firm* — Norton Rose Fulbright Canada LLP

(57) ABSTRACT

A system and methods for adding a personal touch to auto-reply email messages is presented herein. The system and method involve a user enabling a personalized auto-reply feature in their email client, the email client communicating such enablement to a related email server, the email server receiving an email message for the user, the email server determining personal identifier of the sender of the email message and the email server sending a personalized auto-reply using the determined personal identifier to compose and send an auto-reply with a personal touch. The email server may determine the personal identifier through searching one of the user's address book or a global address list for an address entry having the reply address found in the received message's header or the email server may search the body of the received email message to determine personal identifier.

12 Claims, 5 Drawing Sheets

SYSTEM AND METHOD FOR AUTOMATICALLY RESPONDING TO A MESSAGE SENT TO A USER AT AN EMAIL SERVER

CROSS-REFERENCE TO RELATED APPLICATIONS

This is the first application filed for the present invention.

FIELD OF THE INVENTION

The invention relates generally to the field of electronic communications and particularly to a system and method for automatically responding to a message sent to a user in a personalized manner at an email server.

BACKGROUND OF THE INVENTION

Electronic Mail (email) is commonplace in today's business environment. Many businesses run largely on email and are dependant on the effectiveness of email for achieving business goals. A typical email system comprises an email server responsible for handling the email of a plurality of user accounts and an email client used by a user to effectuate many email related tasks such as composing, sending, receiving and reading emails. Such email systems are well known in the art, examples of email servers include Microsoft® Exchange, Webmail, Novell® GroupWise® and Lotus® Domino®; examples of email clients include Microsoft® Outlook®, Webmail and Lotus® Notes®.

It is a well known feature of such email systems for a user to enable an auto-reply feature. An auto-reply feature provides for an email server to automatically send a reply email in response to a received email on a user's behalf. In this manner, while a user is not checking their email, a brief auto-reply email is sent in response to any emails received for the user so that the sender of the received email is notified of the inability of the user to respond. The auto-reply is sent from an email server allowing the user to power-off or otherwise disconnect their email client while away. The user is able to specify the text of the auto-reply email and is typically of the general form:

"Thank you for your email. Please note that I will be out of the office until 5 January. I will respond to your email at that time."

Prior to commencing a period of not checking their email, a user typically enables the auto-reply feature by, for example, using an automatic response setup application of a desktop or internet based email client to turn on the auto-reply feature. Examples of such setup applications include the Out of Office Assistant in Microsoft® Outlook® and Vacation Response in Webmail. Each of these setup applications configures the email server responsible for handling the user's email to monitor and auto-reply to emails received for the user. Once the auto-reply feature has been enabled for the user, the email server automatically replies to all emails received for the user in the specified manner without input from the user.

Certain email systems allow limited customization of the specified auto-reply message.

For example Webmail allows a user to specify two auto-reply messages; a first auto-reply message to be sent as a default auto-reply and a second auto-reply message to be sent to all messages which were sent from a sender whose email address matches a certain domain (ie. All messages received from senders whose email address is from @company.com).

As another example, Microsoft® Outlook® allows a user to specify an unbounded number of auto-reply messages. Each of the auto-reply messages can be specified to be sent based on the properties of a received message. For example, if a user receives an email from a first sender a first auto-reply message is used to generate the auto-reply and if a user receives an email from a second sender a second auto-reply message is used. This may require the user to set up a separate auto-reply message for each person the user expects to receive an email from.

There also exist software applications known as auto responders. One example of such a software application is PromaSoft AutoResponder. AutoResponder runs on a user's computer and automatically replies to internet emails (POP, IMAP for example) based on configured options. One feature provided by AutoResponder is to enable a user to personalize an auto-reply message based on a specific string from a received message's message header. Such a string is of the general form:

From: "Joe Blo"<jblo@company.com>

AutoResponder is configured to parse this string in order to extract the portion or a sub-portion of the string indicative of the user's name. The extracted portion or sub-portion is included in the auto-reply message to customize the message. One issue which exists with this solution is that the sender's name ("Joe Blo" for example) may be specified by the sender apart from their email message. It is not uncommon for a user, or a user's IT department, to put something other than their name in this field, for example, their initials, or their names inverted ("Blo, Joe" for example). In such situations, an auto-reply may not be personalized properly as it may be difficult to determine which portion of the string "Blo, Joe" should be used in an auto-reply message.

Another method for personalizing auto-reply messages is disclosed in US Patent Application 2005/0066005 (the '005 application), filed 18 Sep. 2003, naming Gary B. Paul as inventor and entitled "Intelligent Email Detection and Auto Reply Email Technique". The technique disclosed in the '005 application requires an initial, pre-formatted message to be received from a sender, the pre-formatted message containing the sender's name. The sender's name is accurately parsed from a received pre-formatted message and is stored in a database. Upon receiving farther messages from the sender, a database lookup is performed to retrieve the previously stored sender's name and an auto-reply message can be personalized using the retrieved user's name. One problem with this approach is that it is not practical to require a sender to send a pre-formatted message to potential recipients in order to have accurately personalized auto-reply messages.

There is a need for improved auto-reply systems and methods.

BRIEF DESCRIPTION OF THE DRAWINGS

The accompanying drawings illustrate embodiments by way of example only. In the drawings.

Similar numerals may have been used throughout the figures to represent similar components.

DETAILED DESCRIPTION OF THE PREFERRED EMBODIMENTS

An improved auto-reply system and method is provided with reference to specific exemplary embodiments. It is to be understood that though specific email systems are used to provide contextual examples of a system and method for automatically responding to a message sent to a user at an email server, the present disclosure is equally applicable to any other email systems as would be apparent to any person skilled in the art of email systems.

In one embodiment there is provided a method at an email server for automatically responding to an email message sent to a recipient comprising receiving an enable communication from the recipient, receiving the email message from a sender subsequent to receiving the enable communication, determining at least one personal identifier of the sender of the message, populating an auto-reply message with the at least one personal identifier and sending the auto-reply message to the sender of the message.

In another embodiment there is provided an email server capable of automatically responding to an email message sent to a recipient comprising, a receiving module adapted to receive the message from a sender, a determining module adapted to determine at least one personal identifier of the sender of the message, a populating module adapted to populate an auto-reply message with the at least one personal identifier and a sending module adapted to send the auto-reply message to the sender of the message.

In yet another embodiment there is provided a method for setting an automatic response to a message sent to a user in a personalized manner comprising accessing an automatic response setup application, the application having a personalize option, enabling the personalize option within the setup application, confirming the enablement and sending a message representative of the enabling in response to the confirming.

Figure 1:
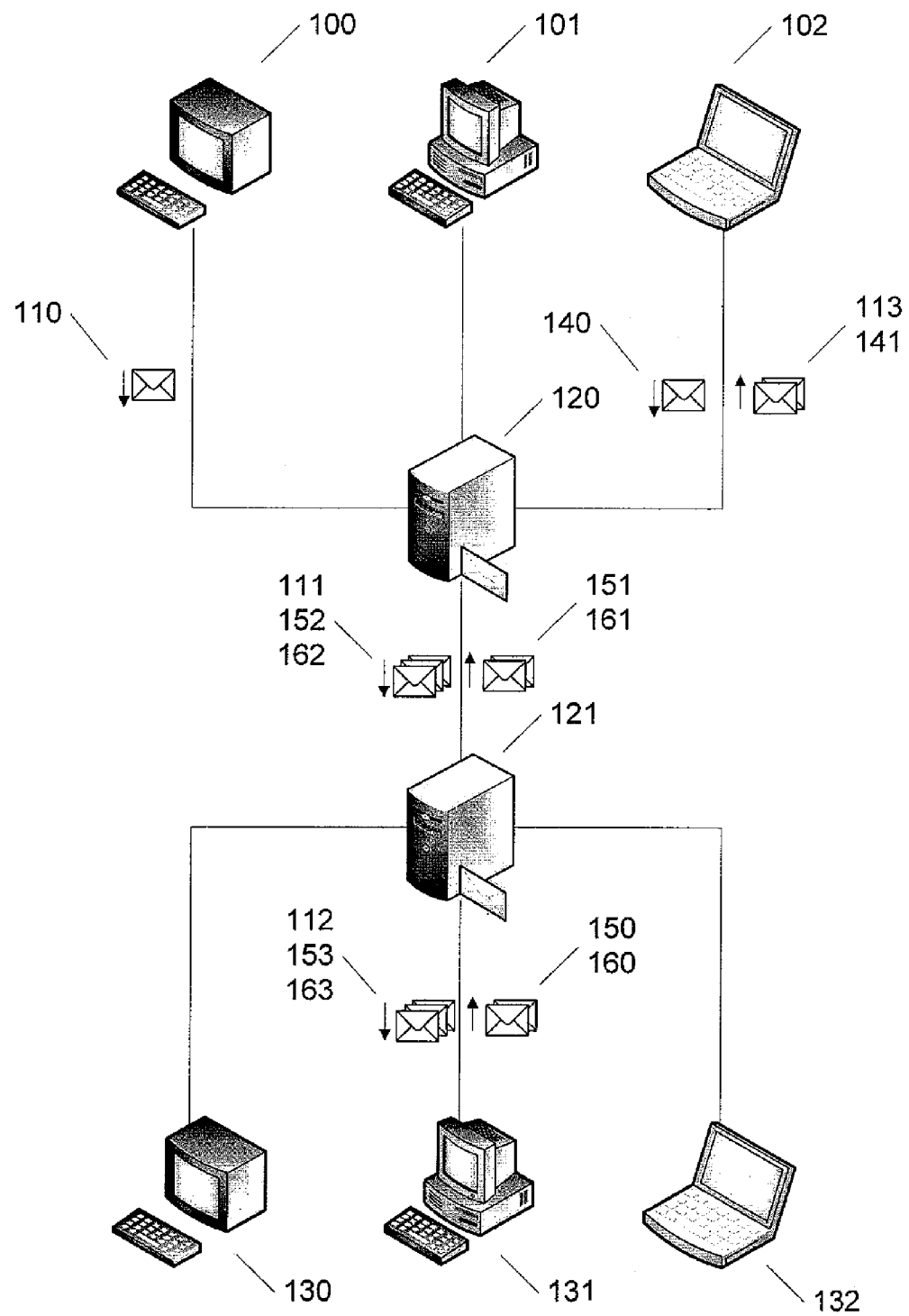
FIG. 1 is a diagram of an exemplary email system operable to automatically respond to a message sent to a user at an email server.

FIG. 1 shows an exemplary email system in which embodiments of the present disclosure may be practiced. The email system of FIG. 1 shows exemplary computing systems 100, 101, 102, 130, 131 and 132 each of which enable a user of the computing system to operate an email client which is stored thereupon, to effectuate email communications. Computing systems 100 and 130 are generally referred to as terminals, operated by a user to access network resources as is commonly known. Computing systems 101 and 131 are generally referred to as personal computers, operated by a user to access local and network resources as is commonly known. Computing systems 102 and 132 are generally referred to as mobile computing devices (such as laptops, cellular telephones, smartphones and the like), operated by a user to access local and network resources via a wireless network such as a cellular network or wireless local area network. Each of computing system 100, 101, 102, 130, 131 and 132 are operable to communicate with other computing systems via such mediums as an intranet or internet, whether wireless or wired as is well known.

Email servers 120 and 121 are computing systems configured to serve email. Common functionality of email servers 120 and 121 include managing user accounts, receiving email, sending email, storing email, enabling user configuration of user accounts and the like as is well known in the art. Examples of commercially available email servers include Microsoft® Exchange®, Webmail, Novell® GroupWise® and Lotus® Domino®.

As shown in FIG. 1, email server 120 is responsible for managing email functionality of user accounts associated with each of the users of computing systems 100, 101 and 102. Managing email functionality includes managing email user account configuration information as well as handling email for each user account. Email server 121 is similarly configured for the users of computing system 130, 131 and 132. Email servers 120 and 121 are capable of communicating email messages between the user accounts for which they are responsible. In this manner, the user of computing system 100 is capable of sending an email message to the user of computing systems 102 and 131 even though the user accounts are managed by different email servers 120, 121.

To help illustrate email communications in the email system of FIG. 1 the following exemplary email communications scenarios are provided involving three users; Ann, Bob and Cathy. In this example, Ann uses computing system 100 and has an email user account managed by email server 120. Bob uses computing system 102 and has an email user account managed by email server 120. Cathy uses computing system 131 and has an email user account managed by email server 121. Ann wishes to send an email to both Bob and Cathy. Using an email client configured to communicate with email server 120, Ann composes the email using computing system 100. Once Ann has composed the email, Ann sends the email which is first sent to email server 120 as email 110. Email server 120 determines appropriate actions to be taken upon receipt of email 110. In this example, email 110 is destined for Bob and Cathy. Email server 120 sends a copy of email 110 to Bob as email 113. As email server 120 is not responsible for managing Cathy's email user account, email server 120 sends a copy of email 110 to the appropriate email server which manages the account of Cathy, exemplified as email 111 sent to email server 121. Email server 120 will typically locate the appropriate email server for a recipient through the use of Domain Name Service (DNS) as is well known in the art. Email server 121 sends a copy of email 111 to Cathy as email 112. It is to be understood that email server 120 and 121 may not send emails 112 and 113 immediately upon receipt of emails 110 and 111 respectively. It is well known in the art that email server 120 and 121 may store emails 112 and 113 until a time when a request for pending email is received from Bob or Cathy. It is also to be understood that intermediary nodes may exist which are not shown, such as data routers, wireless base stations and the like, used for communicating data between various endpoints.

To help illustrate the auto-reply functionality in the email system of FIG. 1 the following exemplary email communication scenario is provided involving a fourth user; Dan. In this example Dan uses computing system 101 and has an email user account managed by email server 120. Dan uses a setup application of the email client on computing system 101 to enable auto-reply messaging at email server 120. Email server 120 stores information representing Dan's enablement of auto-reply messaging. Subsequent to Dan enabling auto-reply messaging, Bob sends Dan email 140 using the email client of computing system 102. Upon receipt of email 140 email server 120 inspects Dan's email user account and ascertains that Dan has enabled auto-reply messaging. Upon ascertaining that Dan has enabled auto-reply messaging, email server 120 sends the auto-reply as email 141 to Bob at computing system 102 in automatic response to email 140.

Subsequent to Dan enabling auto-reply messaging, Cathy sends Dan email 150 using the email client of computing system 131. Email 150 is received by email server 121 which sends a copy of email 150 to email server 120 as email 151 as described above. Upon receipt of email 151 email server 120 inspects the specified location of Dan's email user account and ascertains that Dan has enabled auto-reply messaging. Upon ascertaining that Dan has enabled auto-reply messaging, email server 120 sends the auto-reply message as email 152 to Bob (via email server 121 and email 153) at computing system 131 in automatic response to email 151.

An improved auto-reply system is provided through the enablement of a personalization option when enabling auto-reply messaging. Once the personalization option has been enabled, any email messages received at an email server for a corresponding user account will have a personalized auto-reply message sent in response. The personalized auto-reply message is constructed by the email server using verifiable personal information as determined form the received email message.

According to a preferred embodiment, email server 120 is configured to determine at least one personal identifier of a received email message's sender, such as a first name or last name, a company, a nickname or a display name. Upon determining the personal identifier(s) of the email message's sender, email server 120 is configured to populate a personalized auto-reply email message with at least the personal identifier(s). After populating the personalized auto-reply email message, email server 120 sends the personalized auto-reply email message to the email message's sender in automatic response to the received email message.

To provide further clarity on the above exemplary improved auto-reply system, a specific exemplary email communication will now be detailed. Email 160 (and subsequently email 161) is exemplified by the following:

| | |
|---|---|
| To: | "Drake, Dan" <ddrake@company.com> |
| From: | "Clark, Cathy" <cclark@organisation.org> |
| Subject: | A new order |
| Body: | Dear Dan, |
| | Thank you for your help yesterday. I would like to proceed with placing an order for 100 widgets. Please let me know what information is required to proceed. |
| | Sincerely, |
| | Cathy |

Personalized auto-reply email message 162 (and subsequently 163) is exemplified by the following, wherein the determined at least one personal identifier is Cathy's first name 'Cathy':

| | |
|---|---|
| To: | "Clark, Cathy" <cclark@organisation.org> |
| From: | "Drake, Dan" <ddrake@company.com> |
| Subject: | Re: A new order |
| Body: | Hi Cathy, |
| | Thank you for your email. Please note that I will be out of the office until 5 January. I will respond to your email at that time. |
| | Sincerely, |
| | Dan |

Another personalized auto-reply email message 162 (and subsequently 163) is exemplified by the following, wherein the determined at least one personal identifier is Cathy's nickname 'Cat':

| | |
|---|---|
| To: | "Clark, Cathy" <cclark@organisation.org> |
| From: | "Drake, Dan" <ddrake@company.com> |
| Subject: | Re: A new order |
| Body: | Hey Cat, |
| | I'll be out of the office until 5 January. I'll respond to your email at that time. |
| | Talk to you soon, |
| | Dan |

The foregoing examples are used to provide simple exemplary email communications within the email system of FIG. 1. It is to be understood that additional communications may exist and that many more computing systems, users and email servers can be added to the exemplary email system provided in FIG. 1.

Figure 2:
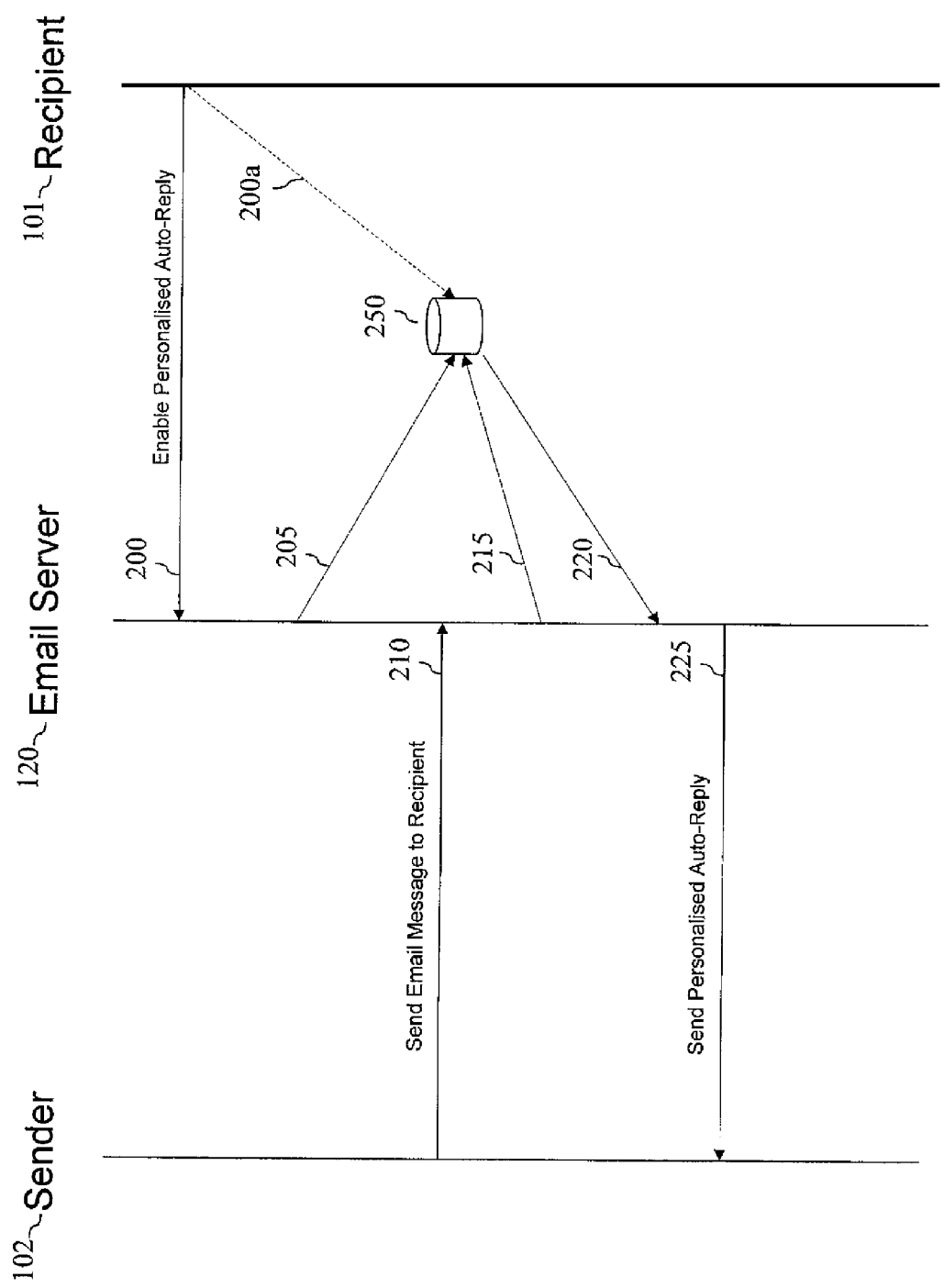
FIG. 2 is a flow diagram illustrating an exemplary set of communications for automatically responding to a message sent to a user at an email server.

Reference is now made to the flow diagram of FIG. 2 which illustrates an exemplary set of communications for automatically responding to a message sent to a user in the email system of FIG. 1. FIG. 2 represents a conversation between 4 entities: a sender 102, an email server 120, a recipient 101 and an email user account data store 250. Sender 102 is equivalent to computing system 102, having an email client thereupon and being used by Bob to effectuate email communications as described in relation to FIG. 1. Email server 120 is as described in relation to FIG. 1. Recipient 101 is equivalent to computing system 101, having an email client thereupon and being used by Dan to effectuate email communications as described in relation to FIG. 1. Email user account data store 250 is a storage member, such as a database, capable of storing information related to email user accounts. Email user account data store 250 can be in remote communication with email server 120 or integral to email server 120, such as resident in a memory of email server 120.

An enable communication, sent as communication 200, is a data message sent from recipient 101 to email server 120 in response to Dan instructing the email client on computing system 101 to enable personalized auto-reply messaging. The information contained in communication 200 comprises indicia that Dan wants to have any email messages received for his user account at email server 120 automatically replied to with a personalized auto-reply message. Communication 200 may further include the general text Dan specifies to be used by email server 120 for composing a personalized auto-reply message. Communication 200 has a format which is dependent on the specific type of email client at recipient 101. For example, if a webmail email client is used, communication 200 is a Hyper Text Transfer Protocol (HTTP) message. Alternatively, if a Microsoft® Outlook® email client is used, communication 200 is a Messaging Application Programming Interface (MAPI) message. Other implementations are possible. A disable communication (not shown) is a data message sent from recipient 101 to email server 120 in response to Dan instructing the email client on computing system 101 to disable personalized auto-reply messaging, whereby email messages received at email sever 120 for Dan are not automatically replied to by email server 120.

Communication 205 is a data message sent from email server 120 to email user account data store 250 sent in response to email server 120 having received communication 200. The information contained in communication 205 comprises indicia that Dan wants to have any email messages received for his user account at email server 120 automatically replied to with a personalized auto-reply message. Communication 205 may further include the general text Dan specifies to be used by email server 120 for composing a personalized auto-reply message. Email user account data store 250 stores the information contained in communication 205. The information contained in communication 205 or the information stored by email user account data store 250 may or may not be the same information included in communications 200 and 205, but may be a representation of such information in a machine-readable or machine-optimized format.

Subsequent to communication 205, Bob, using an email client on computing system 102, sends an email message to Dan, whose email user account is managed by email server 120. The email sent from Bob to Dan is received by email server 120 as communication 210.

Upon receipt of communication 210, email server 120 handles communication 210 by, for example, parsing the communication, identifying the intended recipient email user account and storing the parsed data in email user account data store 250. Upon identifying the intended recipient's email user account, email server is configured to query email user account data store 250 to determine if personalized auto-reply has been enabled for the recipient's email user account. Such a query is exemplified by communication 215 which is sent from email server 120 to email user account data store 250 requesting the personalized auto-reply status of the recipient's email user account. In response to the query of communication 215, email user account data store 250 sends communication 220 which contains the status of the personalized auto-reply status of the intended recipient of communication 210. By way of example, email server 120 queries email user account data store 250 about the personalized auto-reply status currently stored for Dan's email user account in communication 215. Email user account data store 250 responds to the query with communication 220 which includes information that Dan wants any email messages received for his user account at email server 120 to be automatically replied to with a personalized auto-reply message and the general text to be used, as supplied to email user account data store 250 in communication 205.

Email server 120 examines communication 220 and determines that a personalized auto-reply message should be sent in response to communication 210. Communication 225 is an email message automatically sent by email server 120 in response to communication 210, which comprised an email message from Bob to Dan. Communication 225 includes personalized information as will be discussed in detail below.

In an alternative embodiment, communications 200 and 205 may be substituted with a single communication; 200*a*. Communication 200*a* is a data message sent from recipient 101 to email user account data store 250. Communication 200*a* is sent in response to Dan instructing the email client on computing system 101 to enable personalized auto-reply messaging. The information contained in communication 200*a* comprises indicia that Dan wants to have any email messages received for his user account at email server 120 automatically replied to with a personalized auto-reply message. Communication 200*a* may further include the general text Dan specifies to be used by email server 120 for composing the personalized auto-reply message. Communication 200*a* has a format which is dependent on the specific type of email client used by Dan. For example, in the case where Dan is using a webmail email client, communication 200*a* is a Hyper Text Transfer Protocol (HTTP) message; whereas in the case of Dan using Microsoftg Outlook®, communication 200*a* is a Messaging Application Programming Interface (MAPI) message. Email user account data store 250 stores the information contained in communication 200*a* for further use. The information contained in communication 200*a* or the information stored by email user account data store 250 may or may not be the same information included in communication 200*a*, but may be a representation of such information in a machine readable or machine optimized format.

It is also to be understood that the communications described in relation to FIG. 2 may occur in a different manner with equal technical effect. Certain communications may occur in differing orders without affecting the operation of the system and method for automatically responding to a message sent to a user in a personalized manner at an email server.

Figure 3:
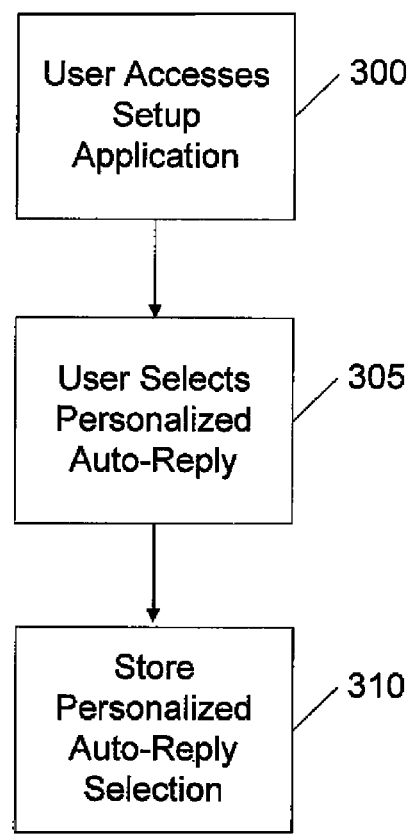
FIG. 3 is a functional diagram illustrating an exemplary method for a user to configure an email server to automatically respond to a message sent to the user at the email server.

Reference is now made to FIG. 3 which is a functional diagram illustrating an exemplary method for a user to configure an email server to automatically respond to a message sent to the user at the email server. The method begins at step 300 which includes a user accessing a setup application of an email client. Exemplary setup applications include Out of Office Assistant in Microsoft® Outlook® and Vacation Response in Webmail. As described in relation to FIG. 1 above, a user accesses a setup application of an email client through use of a computing system such as computing system 100, 101 and 102, which is in turn operable to communicate with an email server, such as email server 120.

Upon accessing the setup application, the user selects personalized auto-reply in step 305. This is accomplished by, for example, the user checking a check box on the setup application's user interface or in any other commonly known manner. Step 305 includes user confirmation through the actuation of a button or other similar member on the setup application's user interface. For example, the user checks a check box which indicates that the personalized auto-reply feature is enabled and then the user presses a button which reads 'Ok'.

In a further embodiment, in addition to selecting personalized auto-reply at step 305, the user may enter a desired general text for use in personalized auto-reply messages. For example, the user may enter desired text into a text box on the user interface and then press a button which reads 'Ok'.

Once the user has selected personalized auto-reply, this selection is stored during step 310. Information stored during step 310 includes the fact that the user wishes to enable personalized auto-reply messaging as well as, optionally, the desired text to be used for personalized auto-reply messages. The information stored during step 310 may be stored at email server 120 or in email user account data store 250 for example.

A method similar to the method shown in FIG. 3 allows a user to configure an email server to not automatically respond to a message sent to the user at the email server by disabling the auto-reply functionality.

Figure 4:
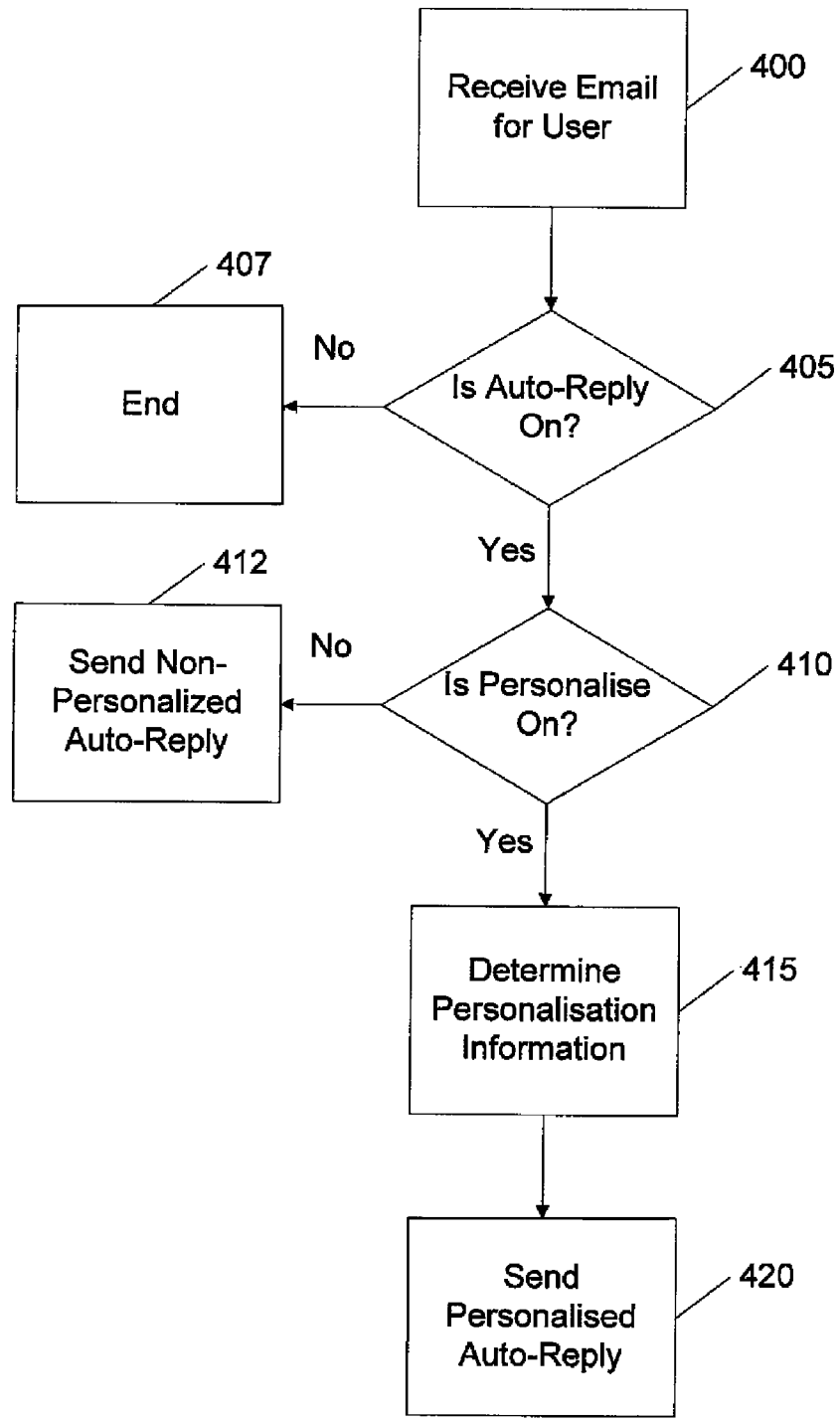
FIG. 4 is a functional diagram illustrating a method for automatically responding to a message sent to a user at an email server.

Reference is now made to FIG. 4 which is a functional diagram illustrating a method for automatically responding to a message sent to a user at an email server. The method begins at step 400 wherein an email message is received by an email server for a recipient email user account as described in relation to FIGS. 1 and 2 above. The email server is email server 120 for example.

Subsequent to receiving the email message in step 400, email server 120 determines if the recipient email user account is presently configured to send auto-reply messages in response to received email messages in step 405. Step 405 is carried out by email server 120 accessing information stored in email user account data store 250 in relation to the recipient email user account. If the information retrieved from email user account data store 250 indicates that auto-reply is not enabled, the method ends at step 407.

If the information retrieved from email user account data store 250 indicates that auto-reply is enabled, email server 120 further accesses information stored in email user account data store 250 in relation to the recipient email user account's personalization preferences (i.e. does the user wish to personalize auto-reply messages and/or the general text to be used for personalizing auto-reply message) in step 410. If the information indicates that the recipient email user account does not want auto-reply messages to be personalized, the method ends at step 412 wherein a non-personalized auto-reply message is sent.

At step 415 email server 120 determines the personal identifier to be used in the personalized auto-reply message which is sent in response to receiving the email message in step 400. Step 415 involves ascertaining information about the sender of the email message received in step 400 and is discussed in further detail in relation to FIG. 5.

Using the personal identifier ascertained or determined in step 415, email server 120 composes and sends a personalized auto-reply message to the sender of the email message received in step 400. Step 410 comprises email server 120 retrieving or otherwise providing the text the user has chosen to be the general text of their personalized auto-reply message (as in step 305 of FIG. 3) from email user account data store 250. Using the retrieved general text, email server 120 replaces specified keywords with the personal identifier determined in step 415. Exemplary embodiments of replacement algorithms include the user including a textual string such as "[First Name]" or "<Nickname/>" and email server 120 searching for and replacing such textual strings with the appropriate personal identifier. In one example, if the user specifies the following general text for their auto-reply.

Hey [First Name],
I'm away for a couple days and I'll get back to ASAP.
Thanks,
Bob.

Email server 120 determines the user's first name in step 415 and uses that first name to replace the string [First Name] using any commonly known method in the art. Once all identified strings having been appropriately replaced with personal identifier, in step 420 email server 120 packages the text into an email as is well known in the art and sends the email as a personalized auto-reply message to the sender of the email message received in step 400.

By way of example, email server 120 is a Microsoft® Exchange® email server and account data store 250 is an Oracle® database and is accessed by email server 120 using MAPI as is well known. At step 405, email server 120 determines the recipient email user account's auto-reply state by requesting or examining a Boolean value stored under the enumerated MAPI tag of PR_EMS_AB_AUTOREPLY (which is stored in email user account data store 250 at 0xS800B000B for example). At step 410, email server 120 determines the recipient email user account's personalization preferences by requesting or examining a Boolean value stored under the enumerated MAPI tag of PR_EMS_AB_AUTOREPLY_PERSONALIZE (which is stored in email user account data store 250 at 0x800B000C for example). In a similar manner, email server 120 determines the subject of the personalized auto-reply email message and the general text of the personalized auto-reply email message by requesting or examining string values stored under the enumerated MAPI tags of PR_EMS_AB_AUTOREPLY_SUBJECT and PR_EMS_AB_AUTOREPLY_MESSAGE respectively.

It is to be understood that steps 405 and 410 may be combined into a single step which may further include determining the desired general text for use in composing the personalized auto-reply.

Figure 5:
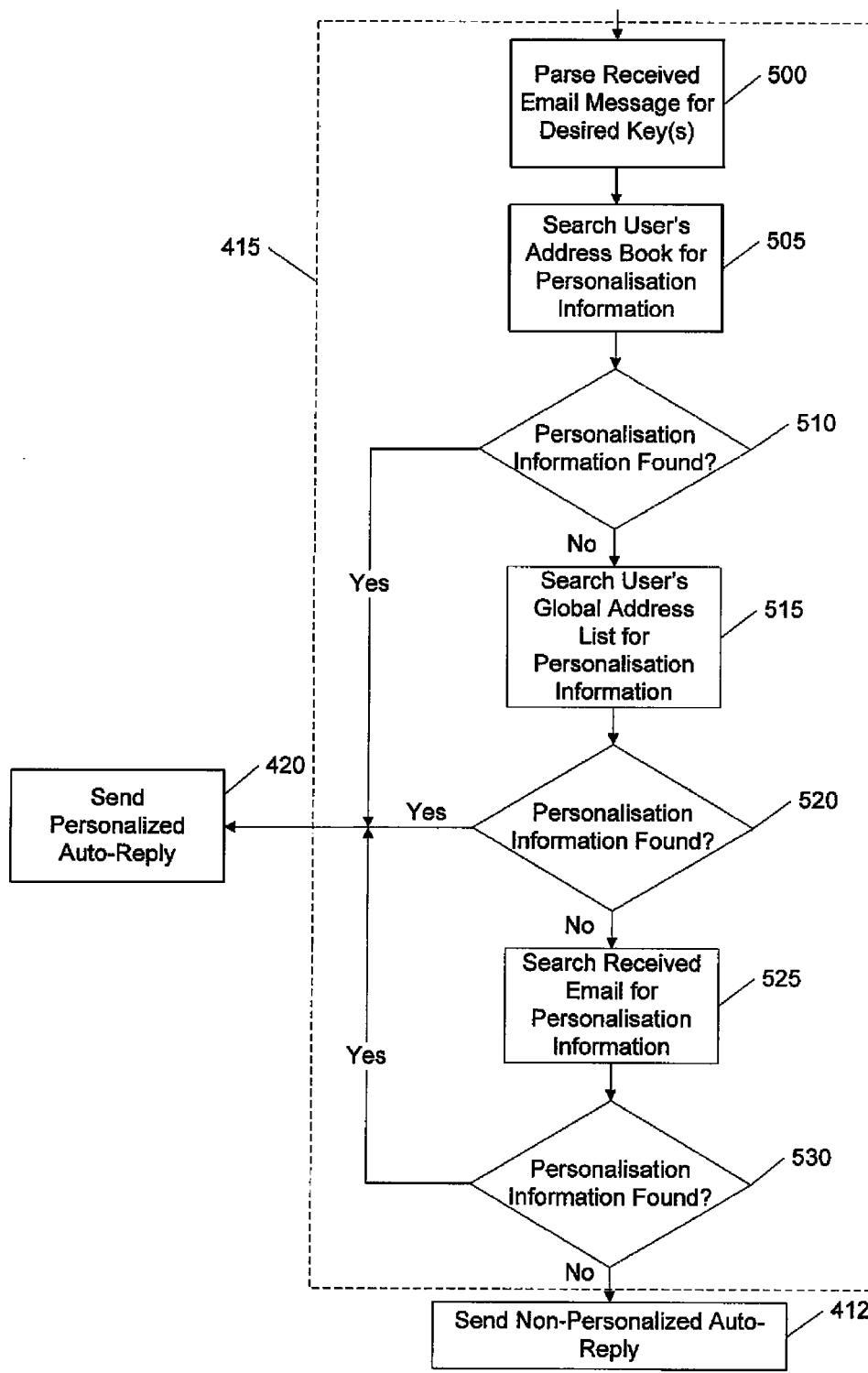
FIG. 5 is another functional diagram illustrating a method for automatically responding to a message sent to a user at an email server.

Reference is now made to FIG. 5 which describes the method of step 415 of FIG. 4 in greater detail. For further clarity, the method in FIG. 5 is executed at email server 120 after an email message has been received and it has been determined that personalized auto-reply has been activated for the recipient of the email message. The method of FIG. 5 personalizes an auto-reply for the received email message in the following manner.

At step 500 a received email message is parsed to extract a personalization key using any of a variety of well known parsing methods. In one embodiment the personalization key is the reply email address as specified in a header of the received email message. The personalization key is used in attempts to farther identify personal identifier of the sender of the received email message such that the auto-reply can be personalized.

In one embodiment, using the key extracted from the received email message in step 500 (e.g. the reply email address), at step 505 email server 120 searches the address book of the recipient of the received email message for an address book entry which corresponds to the key. Step 505 utilizes the reply email address parsed from the message header of the received email message to uniquely identify an entry in the address book. The entry in the address book contains personal information about the sender of the received email message as entered and/or verified by the recipient of the email message. The personal identifier contained in the address book entry, which can be used to generate the personalized auto-reply email message, includes a first name, a nickname, a full name and/or a title for example. An address book is listing of the contacts of a user. A user's address book is typically stored on or is accessible by email server 120 and can be updated by the user through their email client.

At step 510, if personal identifier was found during step 505, the method proceeds to step 420 of FIG. 4 wherein a personalized auto-reply email message is generated and sent using the personal identifier found in step 505.

Alternatively, if personal identifier is not found in step 510, the method proceeds to step 515. In step 515 email server 120 searches a global address list for an address list entry which corresponds to the key. Step 505 utilizes the reply email address parsed from the message header of the received email message to uniquely identify an entry in the global address list which contains personal identifier that is used to generate a personalized auto-reply message. The entry in the global address list contains personal information about the sender of the received email message as entered and/or verified by an administrator of email server 120. The personal identifier contained in the global address list's entry, which can be used to generate the personalized auto-reply email message, includes a first name, a nickname, a full name and/or a title for example. A global address list is a shared address book which can be accessed by members of a domain or corporation. Typical examples of a global address list include the Global Address List (GAL) in Microsoft® Exchange® and the Global Address Book in Lotus® Domino®.

At step 520, if personal identifier was found during step 515, the method proceeds to step 420 of FIG. 4 wherein a personalized auto-reply email message will be generated and sent using the personal identifier found in step 515.

Alternatively, if personal identifier is not found in step 515, the method proceeds to step 525. In step 525 email server 120 will search the body of the received email message for personal identifier. Personal identifier in the body of an email may be recognized using searching methods such as string matching or regular expressions for example. By way of example, email server 120 searches the body of the received email messages for any of the following strings: "Thanks, \r\n", "Thanks.\r\n", "Thank you,\r\n", "Thank you.", "Farewell,\r\n", "Goodbye\r\n", "Bye.\r\n" etc. These strings will be recognized by those in the art as exemplary concluding statements which are typically followed by the name of the sender of the received email. The '\r\n' strings will be recognized by those in the art as carriage returns. Concluding statements often include a formal goodbye followed by a comma, a carriage return and then the message's composer's name. For example, a typical email message may take the form:

Hi Bob,
Thanks for the squash game last night. I look forward to getting even with you next week!
Talk to you later,
Dan In the preceding example, "Talk to you later,\r\n" is the concluding string which email server 120 locates in its search. Upon locating the concluding string, email server 120 assesses subsequent text in the body of the email message and identifying if it is personal identifier. Email server 120 identifies that the subsequent line of text in the body of the email message is personal identifier, by, for example, matching the found string against a listing of names, measuring the length of the text or by applying generally known name recognition algorithms.

At step 530, if personal identifier was determined at step 525, the method advances to step 420 where the text found in step 525 is used as personal identifier to compose and send a personalized auto-reply email message. At step 530, if personal identifier is not located during step 525, the method proceeds to step 412 where a non-personalized auto-reply email message will be sent.

It is to be understood that steps 505, 515 and 525 may occur in a different order that the order specified herein in certain embodiments.

The foregoing examples are meant to provide a skilled reader with the detailed information required to practice a system and method for automatically responding to a message sent to a user in a personalized manner at an email server. The foregoing examples are in no means limited to the presented embodiments. It is to be understood that email server 120 can be any suitable email server, whether a single email server or a unified collection of distributed email servers. Email server 120 can be generally described as comprised of a multitude of modules, each module adapted to execute specific functions as is well known.

What is claimed is:

1. A method at an email server for automatically responding to an email message sent to a recipient comprising:
   receiving an enable communication to enable auto-reply messaging for the recipient, the recipient having an email user account with the email server, the enable communication comprising a personalization option;
   receiving the email message from a sender addressed to the recipient;
   determining that the recipient has enabled auto-reply messaging with the personalization option;
   parsing the email message to extract a personalization key therefrom;
   if a personalization key is extracted, accessing an address book of the recipient;
   searching the address book to find an entry corresponding to the personalization key;
   if a corresponding entry is found, determining at least one personal identifier of the sender of the message from the corresponding entry, populating an auto-reply message with the at least one personal identifier to generate a personalized auto-reply message, and sending the personalized auto-reply message to the sender;
   if a corresponding entry is not found, parsing the email message's body to identify at least one personal identifier in the email message's body, populating an auto-reply message with the at least one personal identifier to generate a personalized auto-reply message, and sending the personalized autoreply message to the sender;
   if neither the corresponding entry nor the at least one personal identifier in the email message's body is found, generating and sending an auto-reply message without personal identifier.

2. The method of claim 1 wherein the step of parsing the email message's body comprises:
   locating a concluding string;
   assessing a text subsequent to the located concluding string; and
   identifying the text as the at least one personal identifier.

3. The method of claim 2 wherein the at least one personal identifier is a first name of the sender.

4. The method of claim 1 wherein the step of parsing comprises parsing a header of the email message, and wherein the step of extracting a personalization key comprises extracting a reply address.

5. The method of claim 1 further comprising determining that the auto-reply messaging with the personalization option is not enabled, skipping the steps of parsing, accessing, and searching, and performing the steps of generating and sending the auto-reply message without personal identifier to the sender.

6. The method of claim 1 further comprising a step of searching a global address list of the recipient to find the corresponding entry before concluding that the corresponding entry has not been found.

7. An email server for automatically responding to an email message sent to a recipient comprising:
   an email user account configuration module for receiving an enable communication to enable auto-reply messaging for the recipient, the recipient having an email user account with the email server, the enable communication comprising a personalization option
   a receiving module adapted to receive the message from a sender addressed to the recipient;
   a parsing and extracting module adapted to parse the email message and extract a personalization key therefrom, and adapted to access an address book of the recipient and search the address book to find an entry corresponding to the personalization key, if a personalization key is extracted;
   a determining module adapted to determine whether a corresponding entry has been found, determine at least one personal identifier of the sender of the message from the corresponding entry and populate an auto-reply message with the at least one personal identifier to generate a personalized auto-reply message, and if a corresponding entry is not found, parse the email message's body to identify at least one personal identifier in the email message's body and populate an auto-reply message with the at least one personal identifier to generate a personalized auto-reply message, and, if neither the corresponding entry nor the at least one personal identifier in the email message's body is found, generate an auto-reply message without personal identifier; and
   a sending module adapted to send one of the personalized auto-reply message and the auto-reply message without personal identifier to the sender of the message.

8. The email server of claim 7 wherein the parsing and extracting module further comprises:
   a locating module adapted to locate a concluding string;
   an assessing module adapted to assess a text subsequent to the located concluding string; and
   an identifying module adapted to identify the text as the at least one personal identifier.

9. The email server of claim 8 wherein the at least one personal identifier is a first name of the sender.

10. The email server of claim 7 wherein the parsing and extracting module is further adapted to parse a header of the email message and extracting a reply address as the personalization key.

11. The email server of claim 7 wherein the determining module is further adapted to determine that the auto-replay messaging with the personalization option is not enabled, generate and send the auto-reply message without personal identifier to the sender.

12. The email server of claim 7 wherein the parsing and extracting module is further adapted to search a global address list of the recipient to find the corresponding entry.

* * * * *